United States Patent
Ferguson

(10) Patent No.: US 8,294,770 B2
(45) Date of Patent: Oct. 23, 2012

(54) SYSTEMS AND METHODS FOR SPATIALLY ISOLATED ARTIFACT DISSECTION, CLASSIFICATION AND MEASUREMENT

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 1103 days.

(21) Appl. No.: 12/099,763

(22) Filed: Apr. 8, 2008

(65) Prior Publication Data

US 2008/0266398 A1 Oct. 30, 2008

Related U.S. Application Data

(60) Provisional application No. 60/910,819, filed on Apr. 9, 2007.

(51) Int. Cl.
H04N 17/00 (2006.01)
G06K 9/40 (2006.01)
G06K 9/36 (2006.01)
G09G 5/00 (2006.01)

(52) U.S. Cl. ........ 348/181; 348/180; 382/254; 382/276; 345/619

(58) Field of Classification Search ............ 348/181, 348/180; 382/254, 276; 345/619
See application file for complete search history.

(56) References Cited

U.S. PATENT DOCUMENTS

| | | | | |
|---|---|---|---|---|
| 5,852,475 A * | 12/1998 | Gupta et al. | ............ | 348/606 |
| 5,920,356 A | 7/1999 | Gupta | | |
| 6,285,801 B1 | 9/2001 | Mancuso | | |
| 6,433,891 B1 * | 8/2002 | Yu et al. | ............ | 358/1.9 |
| 6,437,821 B1 * | 8/2002 | Janko et al. | ............ | 348/180 |
| 7,099,518 B2 * | 8/2006 | Li et al. | ............ | 382/255 |
| 7,102,667 B2 | 9/2006 | Ferguson | | |
| 2001/0031097 A1 | 10/2001 | Mancuso | | |
| 2004/0013315 A1 * | 1/2004 | Li et al. | ............ | 382/268 |
| 2004/0037465 A1 | 2/2004 | Krause | | |
| 2004/0175056 A1 * | 9/2004 | Lee | ............ | 382/286 |

FOREIGN PATENT DOCUMENTS

| | | |
|---|---|---|
| GB | 2347811 A | 9/2000 |
| WO | 2006131866 A | 12/2006 |
| WO | 2007020572 A | 2/2007 |

OTHER PUBLICATIONS

T. Meier, King N. Nagan, G. Crebbin: "Reduction of Blocking Artifacts in Image and Video Coding", IEE Transactions on Circuits and Systems for Video Technology, vol. 9, No. 3, Apr. 1999, pp. 490-500, XP0024905089, p. 493.

* cited by examiner

*Primary Examiner* — Hoang-Vu A Nguyen-Ba
(74) *Attorney, Agent, or Firm* — Matthew D. Rabdau; Michael A. Nelson

(57) ABSTRACT

Embodiments of the present invention relate to a method of measuring a test video frame. A test video input is provided, along with an artifact measurement control, a gradient change measurement is performed based upon the test video input and a gradient change measurement map is provided.

11 Claims, 3 Drawing Sheets

SYSTEMS AND METHODS FOR SPATIALLY ISOLATED ARTIFACT DISSECTION, CLASSIFICATION AND MEASUREMENT

CROSS-REFERENCE TO RELATED APPLICATIONS

This application claims the benefit of U.S. Provisional Application No. 60/910,819 filed on Apr. 9, 2007, entitled Systems and Methods for Spatially Isolated Artifact Dissection, Classification and Measurement, which application is hereby incorporated herein by reference.

BACKGROUND

Embodiments of the present invention relate to video test and measurement, and more particularly to video picture quality (PQ) measurements.

For picture quality analysis, classification of artifacts has long been acknowledged as important and is incorporated in present international standards for methods of picture quality measurement, such as ITU-T J.144. The method presented here allows for analysis of proportions of each class of artifact detected as a contribution to the total impairment measurement, whether objective, as in PSNR, or subjective, as in predicted DMOS. Such dissection of impairments by class is valuable for diagnostic analysis of video processing components, whether components within a video compression encoder or decoder, or a component in a video broadcast chain.

Video compression methods such as MPEG-2 and H.264 process video use lossy compression methods which introduce errors, ideally unseen by the human eye. Any visible error caused by loss in the compression method manifests itself as an impairment artifact which may, or may not, effect the perceived quality of the video. There are different types of impairments, each with different levels of objectionability. Thus, identification of artifacts and weighting the magnitude of the artifact by it's objectionability has been a popular approach to predicting subjective video quality ratings, see ITU-T J.144.

Examples of artifacts seen from video compression are contouring in otherwise smooth gradients, staircase noise along curving edges, "mosquito noise" or ringing around edges, and/or checkerboarding in "busy" regions (sometimes called quilting or blockiness) and blurring. In addition to these compression artifacts, noise or less image correlated artifacts can occur, appearing more like errors of individual pixels as in "snowy" or "speckled" images from a weak analog reception.

Various approaches have been proposed to reduce the effects of image compression. Often artifact reduction algorithms may introduce artifacts of their own, having a method of checking relative proportions of artifacts is useful for video processing HW and SW developers.

Prior art has required mostly separate processing for identification of each artifact, and computationally expensive approaches, in terms of computation time and the cost to provide the necessary level of computing power, which also generally does not guarantee optimal orthogonality (or separation) and accurate relative measure among artifact classes detected. In addition, prior art lacks "completeness" in the sense that the sum of artifacts classified do not necessarily include all differences between reference and test video.

SUMMARY

Accordingly, embodiments of the present invention are provided. A method of measuring a test video frame comprises performing a gradient change measurement based upon the test video input and an artifact measurement control. In some embodiments, a reference video input is also used along with the test video input. Embodiments of the present invention provide gradient change measurement maps. In addition, some embodiments provide a summary measurement, either at the level of each frame, or an overall summary value for a portion of the test video input, up to the entire video sequence. In some embodiments, the gradient change measurement maps may be provided as masks suitable for subsequent video processing or measurements.

In an embodiment of the present invention, the gradient change measurement is made by determining, for each pixel, the gradient amplitude based upon the test video, determining the gradient magnitude, and gradient direction.

DETAILED DESCRIPTION

Figure 1:
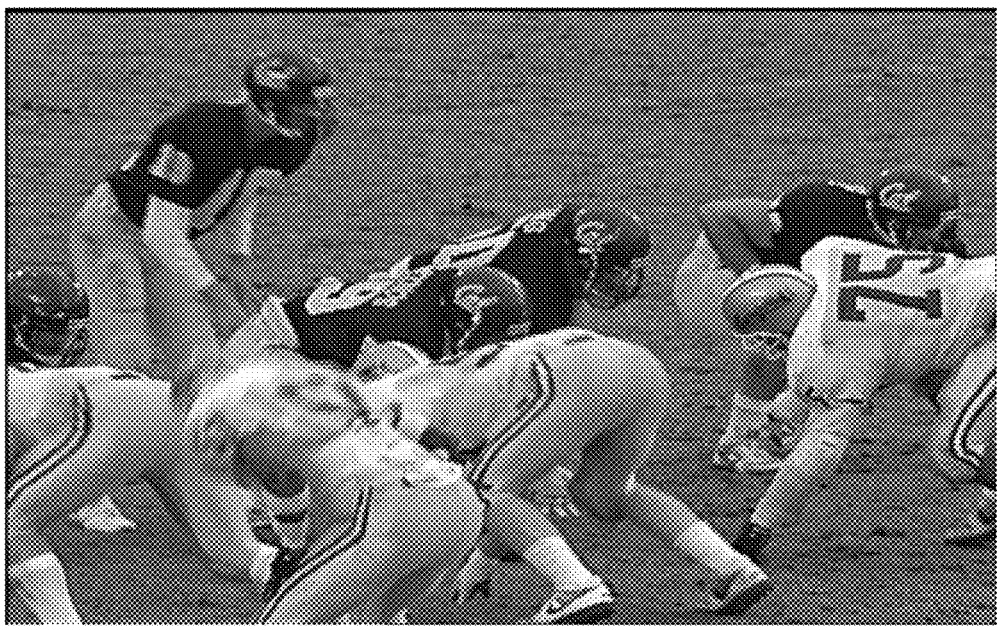
FIG. 1 is an example of an unimpaired video frame of a reference video sequence.
Figure 2:
FIG. 2 is an example of an impaired video frame of a test video sequence.
Figure 3:
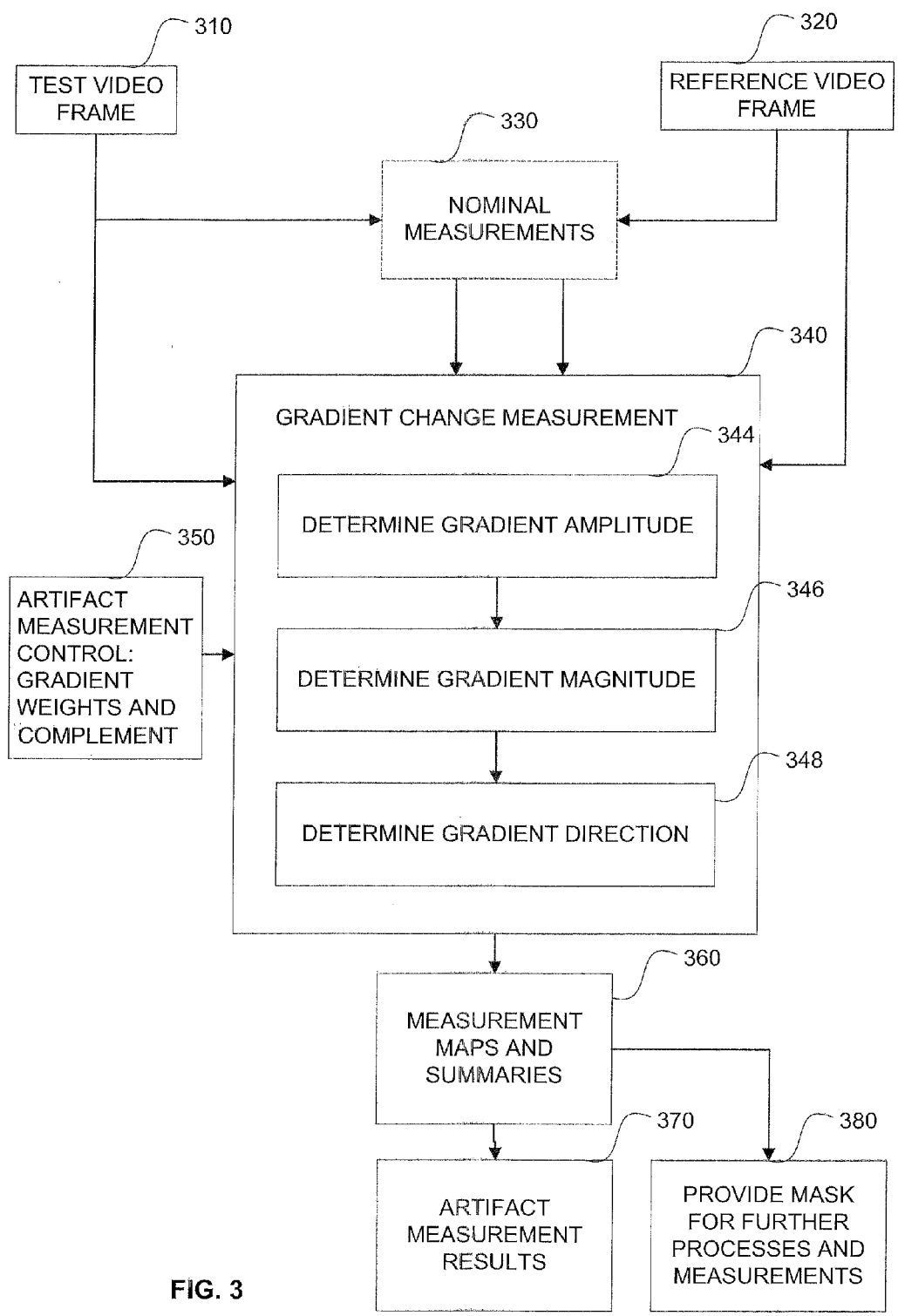
FIG. 3 is a block diagram illustrating embodiments of the present invention.

An embodiment of the present invention is shown in block diagram form in FIG. 3. This apparatus processes an input video under test such as the (somewhat extreme) block impaired image of FIG. 2. If available, the corresponding reference, for example as shown in FIG. 1, is also input.

Figure 4:
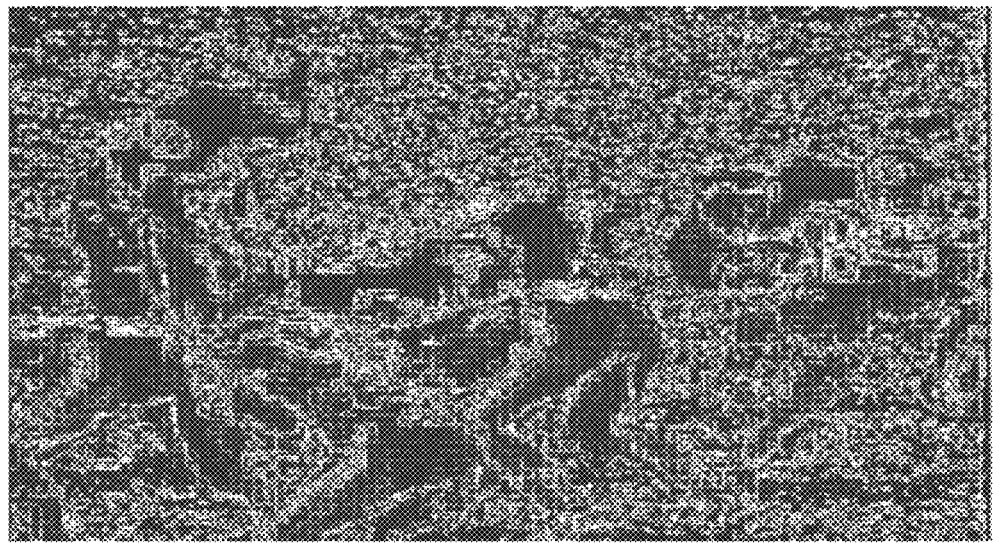
FIG. 4 is an example of a rotated edge map corresponding to FIG. 1 and FIG. 2 depicting edge blocking.
Figure 5:
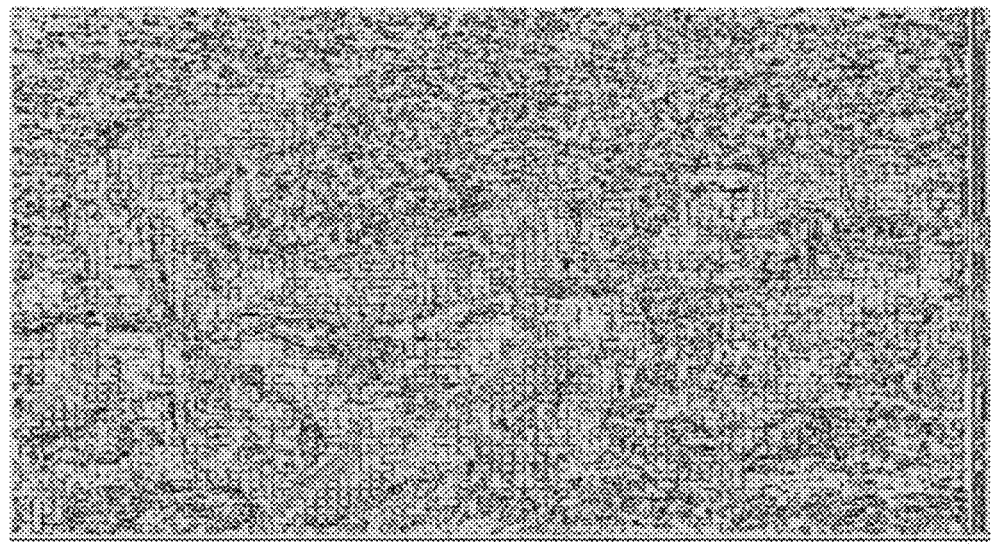
FIG. 5 is an example of the compliment to the rotated edge map of FIG. 4.

In some embodiments, measurements may be output directly. FIG. 4 provides an example of a rotated edge map depicting "edge blocking" corresponding to the video frames shown in FIG. 1 and FIG. 2. FIG. 5 provides an example of the compliment to the rotated edge map shown in FIG. 4. In alternative embodiments the measurements are used as a mask for another measurement such as that described in U.S. Pat. No. 7,102,667, by Kevin M. Ferguson and entitled Picture Quality Diagnostics for Revealing Cause of Perceptibility (the '667 patent), which is hereby incorporated herein by reference.

Each measurement has a compliment such that the measurement and it's compliment added equal a total. For example, the total is 1 when used as a mask as per the '667 patent or the total is the maximum range for the measurement (generally ranging from 0 to 100%, but other units may be selected). The use of this compliment helps to guarantee completeness.

Explicit artifact classification and measurement includes those classified by changes in gradients. These explicit measurements may be added with weights for both objective and subjective measurements, again according to the '667 patent. Thus, the compliment to the sum of all explicit measurements is an implicit measurement of any artifacts not covered by the explicit measurements. Again, this gives completeness to the set of classified artifacts, even though it does not necessarily dissect/delineate artifacts exhaustively: Further dissection/delineation is possible by further processing of the explicit and implicit classes so far delineated.

Changes in gradients (and edges) are measured within 3 classes of changes:

1) Detail added: ringing, mosquito noise, other noise
2) Detail removed: blurring, reduced contrast, loss of detail in general
3) Edges rotated: block artifacts, "jaggies," etc.

For both test and reference video frames, the method estimates gradients in four directions and their opposites covering edges with these orientations:

-, |, / & \ that is, h for horizontal, v for vertical, f for forward slant and b for backward slant Referring to the embodiment shown in FIG. 3, a test video frame 310 is provided, along with the reference video frame 320. In one alternative embodiment, the test video frame and the reference video frame are used to make nominal measurements 330. The nominal measurements may provide maps or other data to the gradient change measurement 340. In other embodiments, the test video frame 310, along with the reference video frame 320 are provided directly to the gradient change measurement 340. The gradient change measurement may be controlled by the artifact measurement control 350, which provides gradient weights and compliment control. The gradient change measurement 340 provides measurement maps and summaries 360. The gradient measurement maps and summaries may in some embodiments be used to provide artifact measurement results 370. Alternatively, the gradient measurement maps are provided as masks 380 for further processing and measurements, for example using the process described in the '667 patent.

Within the gradient change measurement 340, the following steps are performed for each pixel:

1) gradient amplitudes of each of the 4 basic gradient orientation filters is determined 344;

2) gradient magnitude 346 is determined. The gradient magnitude corresponds to the absolute value of the amplitude. The largest of the 4 output magnitudes is determined; and 3) gradient direction 348 corresponding to the largest magnitude is determined. The gradient direction corresponds to the filter used in step 1 and the sign of the corresponding amplitude)

Directions are enumerated as follows:

0=no direction detected (no gradient)
1=+h (-: right, 0 degrees)
2=+f (/: right and up, 45 degrees)
3=+v (|: up, 90 degrees)
4=+b (\: left and up, 135 degrees)
5=-h (-: left, 180 degrees)
6=-f (/: left and down, -135 degrees)
7=-v (|: down, -90 degrees)
8=-b (\: right and down, -45 degrees)

The following 3 classes of gradient changes are measured:

---

1) Detail added: if delta = testGradMag - refGradMag > 0, delta
2) Detail removed: if delta = testGradMag - refGradMag < 0, | delta |
3) Edges rotated: if ( refGradType != testGradType ) && (testGradType == odd ),
  blocking = testGradMag

---

The 8 gradient orientations are represented by 4 orientations and polarity (1 or −1). An example of 3×3 filter kernels representing the 4 orientations is:

```
{   -GRAD_SCALE, -GRAD_SCALE, -GRAD_SCALE,   // Horizontal (--) Edge
         0,              0,              0,
    GRAD_SCALE, GRAD_SCALE, GRAD_SCALE
},
{   -GRAD_SCALE, -GRAD_SCALE,           0,   // "Forward" Diagonal (/) Edge
    -GRAD_SCALE,           0, GRAD_SCALE,
         0,          GRAD_SCALE, GRAD_SCALE
},
{   -GRAD_SCALE,           0,   GRAD_SCALE,  // Vertical (|) Edge
    -GRAD_SCALE,           0,   GRAD_SCALE,
    -GRAD_SCALE,           0,   GRAD_SCALE
},
{            0,  GRAD_SCALE,   GRAD_SCALE,   // "Backward" Diagonal (\) Edge
    -GRAD_SCALE,           0,   GRAD_SCALE,
    -GRAD_SCALE, -GRAD_SCALE,            0
}
``` where GRAD_SCALE=normalizing factor=1/(number of non-zero elements)=⅙ in this example.

The resulting maps may then be pooled to create summary measures for each frame and the entire video sequence according to the '667 patent for example.

What is claimed is:

1. A method of measuring a test video frame comprising:
providing a test video input;
providing an artifact measurement control;
performing a gradient change measurement based upon the test video input; and
providing a gradient change measurement map;
wherein the gradient change measurement comprises:
determining a gradient amplitude based upon the test video input;

determining a gradient magnitude based upon the test video input; and determining a gradient direction based upon the test video input;

wherein the steps of determining the gradient amplitude, the gradient magnitude and the gradient direction are performed for each pixel of a frame from the test video input; and wherein the gradient magnitude is determined using the largest absolute value of amplitude of four gradient filters.

2. The method of claim 1, further comprising providing a reference video input along with the test video input and performing the gradient change measurement using both the test video input and the reference video input.

3. The method of claim 1, further comprising performing nominal measurements based upon the test video input, and performing the gradient change measurement based upon a nominal measurements map.

4. The method of claim 3, further comprising using a reference video input for making the nominal measurements.

5. The method of claim 1, wherein the artifact measurement control provides gradient weights.

6. The method of claim 1, further comprising providing the gradient change measurement map as a mask for further video measurements.

7. The method of claim 1, further comprising providing a summary gradient change measurement.

8. The method of claim 1, further comprising providing artifact measurement results.

9. The method of claim 1, wherein determining the gradient magnitude comprises determining an absolute value for a gradient amplitude.

10. The method of claim 1, wherein the gradient direction corresponds to the filter used in the step of determining the gradient magnitude and the sign of the corresponding gradient amplitude.

11. The method of claim 1, wherein the gradient change measurement further comprises classifying a gradient change as either detail added, detail removed, or edges rotated based upon the gradient amplitude, the gradient magnitude, and the gradient direction.

* * * * *